(12) United States Patent
Bialy et al.

(10) Patent No.: US 12,466,100 B2
(45) Date of Patent: Nov. 11, 2025

(54) FOOD-PROCESSING SYSTEM

(71) Applicant: PROVISUR TECHNOLOGIES, INC., Chicago, IL (US)

(72) Inventors: Jürgen Bialy, Oeschebüttel (DE); Klaus Guggemos, Rettenberg (DE); Paul Goroll, Waltenhofen (DE); Matthias Hindorff, Waltenhofen (DE); Alexander May, Waltenhofen (DE); Klaus Dieter Schroff, Constance (DE); Florian Mohr, Sulzberg (DE)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 196 days.

(21) Appl. No.: 18/548,831

(22) PCT Filed: Feb. 17, 2022

(86) PCT No.: PCT/EP2022/053942
§ 371 (c)(1),
(2) Date: Sep. 1, 2023

(87) PCT Pub. No.: WO2022/184454
PCT Pub. Date: Sep. 9, 2022

(65) Prior Publication Data
US 2024/0308099 A1 Sep. 19, 2024

(30) Foreign Application Priority Data
Mar. 3, 2021 (DE) ...................... 10 2021 105 098.7

(51) Int. Cl.
B26D 7/06 (2006.01)
B26D 5/00 (2006.01)
(Continued)

(52) U.S. Cl.
CPC ............... *B26D 7/32* (2013.01); *B26D 5/007* (2013.01); *B26D 7/0625* (2013.01);
(Continued)

(58) Field of Classification Search
CPC ...... B26D 5/005; B26D 5/007; B26D 7/0616; B26D 7/0625; B26D 7/18; B26D 7/30; B26D 7/32; B26D 2210/02
(Continued)

(56) References Cited

U.S. PATENT DOCUMENTS 3,109,532 A 11/1963 Milan
3,685,634 A 8/1972 Bergling
(Continued)

FOREIGN PATENT DOCUMENTS

CN 103552791 A 2/2014
CN 107802214 A 3/2018
(Continued)

OTHER PUBLICATIONS

"Flying Motion XPlanar" Nov. 1, 2018, pp. 1-28, XP055668904.
(Continued)

*Primary Examiner* — David J Parsley
(74) *Attorney, Agent, or Firm* — Klintworth & Rozenblat LLP

(57) ABSTRACT

A food-processing system for processing food products (e.g. pieces of meat, pieces of cheese) includes a cutting device for cutting the food products into slices and a conveyor for conveying the food product portions away from the cutting device along a main conveyor path. The conveyor fulfills several functions in the food-processing system, such as buffering, aligning, orienting and product formatting of the food product portions, by a discontinuous conveyor. The discontinuous conveyor includes at least one conveyed-products carrier movable along the main conveying path.
(Continued)

The main conveying path is freely programmable within a conveying area.

20 Claims, 9 Drawing Sheets

(51) Int. Cl.
    *B26D 7/18*     (2006.01)
    *B26D 7/30*     (2006.01)
    *B26D 7/32*     (2006.01)

(52) U.S. Cl.
    CPC ......... *B26D 7/1836* (2013.01); *B26D 7/1854* (2013.01); *B26D 7/1863* (2013.01); *B26D 7/30* (2013.01); *B26D 2210/02* (2013.01)

(58) Field of Classification Search
    USPC .............................................. 83/78, 85, 112
    See application file for complete search history.

(56) References Cited

U.S. PATENT DOCUMENTS

| | | | |
|---|---|---|---|
| 4,800,999 A | 1/1989 | Matsuo | |
| 5,078,255 A | 1/1992 | Haley | |
| 5,156,093 A | 10/1992 | Azukizawa et al. | |
| 5,319,186 A | 6/1994 | Lenhardt | |
| 5,880,541 A | 3/1999 | Hinds et al. | |
| 5,947,361 A | 9/1999 | Berger et al. | |
| 6,045,319 A | 4/2000 | Uchida et al. | |
| 6,390,276 B1 | 5/2002 | Haug et al. | |
| 6,505,730 B1 | 1/2003 | Linder | |
| 7,926,644 B2 | 4/2011 | Mendenhall | |
| 8,166,856 B2 | 5/2012 | Kim et al. | |
| 8,707,840 B2 | 4/2014 | Weber | |
| 8,820,202 B2 * | 9/2014 | Schaub | B26D 7/32 83/932 |
| 9,221,615 B2 * | 12/2015 | Bauer | B26D 7/32 |
| 9,764,490 B2 | 9/2017 | Weber | |
| 10,094,843 B2 | 10/2018 | Malinowski et al. | |
| 10,227,182 B2 | 3/2019 | Burk et al. | |
| 10,308,437 B2 | 6/2019 | Clössner et al. | |
| 10,569,973 B2 | 2/2020 | Burk et al. | |
| 10,577,136 B2 | 3/2020 | Burk et al. | |
| 10,618,749 B2 | 4/2020 | Clössner et al. | |
| 10,751,899 B2 | 8/2020 | Lischinski et al. | |
| 10,836,063 B2 | 11/2020 | Mayer et al. | |
| 11,964,827 B2 * | 4/2024 | Mueller | B65B 25/08 |
| 2003/0089581 A1 | 5/2003 | Thompson et al. | |
| 2003/0230941 A1 | 12/2003 | Jacobs | |
| 2004/0016331 A1 * | 1/2004 | Wolcott | B26D 7/32 83/768 |
| 2004/0231480 A1 | 11/2004 | Wattles et al. | |
| 2005/0189271 A1 | 9/2005 | Cerutti et al. | |
| 2008/0038020 A1 | 2/2008 | Chung et al. | |
| 2010/0256810 A1 * | 10/2010 | Weber | B65G 47/24 198/398 |
| 2012/0042758 A1 | 2/2012 | Weber | |
| 2012/0186948 A1 | 7/2012 | Ishino et al. | |
| 2013/0062160 A1 | 3/2013 | Steinbach et al. | |
| 2013/0140372 A1 | 6/2013 | Mahadeswaraswamy et al. | |
| 2013/0153364 A1 | 6/2013 | Bauer | |
| 2013/0192175 A1 * | 8/2013 | Matysiak | B26D 11/00 53/514 |
| 2014/0224620 A1 | 8/2014 | Fullerton et al. | |
| 2014/0253896 A1 | 9/2014 | Wu et al. | |
| 2015/0321369 A1 * | 11/2015 | Froese | B26D 7/30 53/514 |
| 2016/0282378 A1 | 9/2016 | Malinowski et al. | |
| 2017/0174445 A1 | 6/2017 | Nichau et al. | |
| 2017/0212506 A1 | 7/2017 | Pfarr et al. | |
| 2018/0303034 A1 | 10/2018 | Hasenour et al. | |
| 2018/0303035 A1 | 10/2018 | Hasenour | |
| 2018/0345520 A1 * | 12/2018 | Eckhardt | B26D 5/00 |
| 2019/0152724 A1 | 5/2019 | Philipp et al. | |
| 2020/0030995 A1 | 1/2020 | Lu et al. | |
| 2020/0031594 A1 | 1/2020 | Ragan et al. | |
| 2020/0254641 A1 | 8/2020 | Hocker et al. | |

FOREIGN PATENT DOCUMENTS

| | | |
|---|---|---|
| CN | 111279595 A | 6/2020 |
| DE | 3642123 A1 | 6/1988 |
| DE | 3711688 A1 | 10/1988 |
| DE | 4033475 A1 | 4/1992 |
| DE | 19515199 A1 | 10/1996 |
| DE | 19522189 A1 | 1/1997 |
| DE | 19738159 A1 | 3/1999 |
| DE | 19914707 A1 | 10/2000 |
| DE | 10009903 A1 | 9/2001 |
| DE | 10043304 A1 | 9/2001 |
| DE | 19955042 C2 | 4/2002 |
| DE | 10143506 A1 | 5/2003 |
| DE | 10220006 A1 | 11/2003 |
| DE | 202004008678 U1 | 8/2004 |
| DE | 102006025545 A1 | 12/2007 |
| DE | 102007005994 A1 | 8/2008 |
| DE | 102007006355 A1 | 8/2008 |
| DE | 102007020392 A1 | 11/2008 |
| DE | 102007025822 A1 | 12/2008 |
| DE | 102007028857 A1 | 1/2009 |
| DE | 202008010439 U1 | 1/2009 |
| DE | 202008016678 U1 | 3/2009 |
| DE | 102008039764 A1 | 5/2010 |
| DE | 202010010157 U1 | 10/2010 |
| DE | 102009046893 A1 | 5/2011 |
| DE | 102010019248 A1 | 11/2011 |
| DE | 202011106265 U1 | 12/2011 |
| DE | 102010055722 A1 | 6/2012 |
| DE | 102012004372 A1 | 9/2013 |
| DE | 102013212377 A1 | 12/2014 |
| DE | 102014106400 A1 | 11/2015 |
| DE | 102014214696 A1 | 1/2016 |
| DE | 102014116232 A1 | 5/2016 |
| DE | 102014116233 A1 | 5/2016 |
| DE | 102014118965 A1 | 6/2016 |
| DE | 102014118972 A1 | 6/2016 |
| DE | 102014118978 A1 | 6/2016 |
| DE | 102014119350 A1 | 6/2016 |
| DE | 102015109633 A1 | 12/2016 |
| DE | 102015112561 A1 | 2/2017 |
| DE | 102015114370 A1 | 3/2017 |
| DE | 102016107976 A1 | 11/2017 |
| DE | 102016108002 A1 | 11/2017 |
| DE | 102016109435 A1 | 11/2017 |
| DE | 102016110039 A1 | 12/2017 |
| DE | 102016111357 A1 | 12/2017 |
| DE | 102016122171 A1 | 4/2018 |
| DE | 102016224951 | 6/2018 |
| DE | 102017002020 A1 | 9/2018 |
| DE | 102018102919 B3 | 3/2019 |
| DE | 102017129162 A1 | 6/2019 |
| DE | 102017131304 A1 | 6/2019 |
| DE | 102018105807 A1 | 9/2019 |
| DE | 102019101290 B3 | 1/2020 |
| DE | 202020102692 U1 | 6/2020 |
| DE | 102019110313 B3 | 7/2020 |
| DE | 102019117431 A1 | 12/2020 |
| DE | 102019127275 A1 | 1/2021 |
| DE | 102021105103 A1 | 9/2022 |
| DE | 102021105105 A1 | 9/2022 |
| EP | 0246098 A2 | 11/1987 |
| EP | 0350473 A1 | 1/1990 |
| EP | 0373844 A1 | 6/1990 |
| EP | 0496046 A1 | 7/1992 |
| EP | 0647552 A1 | 4/1995 |
| EP | 0482424 B1 | 1/1996 |
| EP | 1216938 A1 | 6/2002 |
| EP | 2407037 A1 | 1/2012 |
| EP | 2460446 A1 | 6/2012 |
| EP | 2479111 A2 | 7/2012 |
| EP | 2479123 A1 | 7/2012 |
| EP | 2599721 A2 | 6/2013 |

(56) References Cited

FOREIGN PATENT DOCUMENTS

| | | |
|---|---|---|
| EP | 2653036 A1 | 10/2013 |
| EP | 2673224 B1 | 1/2015 |
| EP | 3028774 A1 | 6/2016 |
| EP | 3037369 B1 | 3/2018 |
| EP | 3339221 | 6/2018 |
| EP | 3378804 A1 | 9/2018 |
| EP | 3501676 A1 | 6/2019 |
| EP | 3656707 A1 | 5/2020 |
| EP | 3656709 A1 | 5/2020 |
| EP | 3904249 A1 | 11/2021 |
| EP | 3707810 B1 | 1/2022 |
| EP | 2759047 B1 | 3/2022 |
| EP | 4107026 A1 | 12/2022 |
| EP | 3602759 B1 | 6/2023 |
| GB | 2185720 A | 7/1987 |
| JP | S54139687 A | 10/1979 |
| JP | S5978311 U | 5/1984 |
| JP | 2019102658 A | 6/2019 |
| KR | 20130000763 A | 1/2013 |
| KR | 102063156 B1 | 1/2020 |
| WO | WO2003029651 A2 | 4/2003 |
| WO | WO2007135006 A1 | 11/2007 |
| WO | WO2009143335 A2 | 11/2009 |
| WO | WO2010011237 A1 | 1/2010 |
| WO | WO2010085670 A1 | 7/2010 |
| WO | WO2011138448 A1 | 11/2011 |
| WO | 2013/059934 | 5/2013 |
| WO | WO2013098202 A1 | 7/2013 |
| WO | WO2013131893 A1 | 9/2013 |
| WO | WO2015162182 A1 | 10/2015 |
| WO | WO2016012171 A1 | 1/2016 |
| WO | WO2016071062 A1 | 5/2016 |
| WO | WO2017202521 A1 | 11/2017 |
| WO | WO2018019810 A1 | 2/2018 |
| WO | 2018067567 | 4/2018 |
| WO | 2018208658 | 11/2018 |
| WO | WO2020073118 A1 | 4/2020 |
| WO | 2020239930 A1 | 12/2020 |
| WO | 2020243814 | 12/2020 |
| WO | WO2020260564 A1 | 12/2020 |
| WO | 2021126737 A2 | 6/2021 |
| WO | 2022184455 A1 | 9/2022 |
| WO | WO2024092082 A1 | 5/2024 |

OTHER PUBLICATIONS

Timocom GmbH "Stetigförderer TIMOCOMTransportlexikon" Feb. 25, 2021,pp. 1-1 XP055922793.

International Search Report and Written Opinion for PCT/EP2022/053976 mailed dated Sep. 5, 2022, 23 pages.

International Search Report and Written Opinion for PCT/EP2022/053942 mailed dated Sep. 8, 2022, 25 pages.

International Search Report and Written Opinion for PCT/EP2022/053944 mailed dated May 24, 2022, 12 pages.

International Search Report and Written Opinion for PCT/EP2022/053955 mailed dated May 4, 2022, 14 pages.

International Search Report and Written Opinion for PCT/EP2022/053951 mailed dated May 17, 2022, 17 pages.

International Search Report and Written Opinion for PCT/EP2022/053953 mailed dated May 31, 2022, 14 pages.

Excerpt from textbook "Standard Handbook of Industrial Automation", ISBN 9781461319634, publication date Dec. 6, 2012.

EU Directive 2006/42/EC of the European Parliament and of the Council dated May 17, 2006 on machinery, and amending Directive 95/16/EC (recast), 87 pages.

Schaeffler AG advertising brochure, as of Jan. 2014, available no later than Feb. 2014, IDAM INA Drives and Mechatronics, X-Y-Positioniersysteme auf Basis der Planarmotor-Technologie, 12 pages (URL: https://web.archive.org/web/20140000000000*/https://www.schaeff-ler.com/remotemedien/media_shared_media/08_media_library/01_publications/idam_1/brochures/downloads_32/idam_planarmotoren_de_de.pdf ).

* cited by examiner

FOOD-PROCESSING SYSTEM

FIELD OF THE DISCLOSURE

The invention relates to a food-processing system for processing food products, in particular for slicing pieces of meat, pieces of cheese, sausage sticks or salami sticks.

BACKGROUND

Such food-processing systems are known from the prior art, which firstly comprise a cutting device, which is also referred to as a "slicer" in accordance with the usual technical terminology, and which slices the food products (e.g. pieces of meat, pieces of cheese, sausage sticks or salami sticks), one or more of the slices then forming a food product portion.

Furthermore, the known food-processing systems have complicated conveyor systems which take over the food product portions from the cutting device and transport them to a packaging machine (e.g. thermoforming device).

SUMMARY

Here, the conveyor system between the cutting device and the packaging machine fulfills several functions, which are briefly described below. For example, the conveyor system can buffer the food product portions delivered by the cutting device in a buffer zone by means of a buffer conveyor, so that a sufficient quantity of food product portions is always available downstream of the buffer zone. In addition, the conveyor system can align the food product portions in a lateral direction transverse to the main conveying path by means of so-called shuttle conveyors, the shuttle conveyors being displaceable transverse to the main conveying path. Furthermore, there is the possibility that the food product portions are reoriented, for example by rotating the food product portions. Finally, there is also the possibility of product formatting, for example by converting a certain number of incoming conveyor tracks into a certain number of outgoing conveyor tracks. In this way, for example, a three-track cutting device can feed a two-track packaging machine.

In the known food-processing systems, the functions briefly described above are realized by a complicated arrangement of conveyor belts, so that the known food-processing system is relatively complicated. Thus, in the prior art, to perform the various functions (buffering, aligning, reorienting, product formatting), belt conveyors are used which belong to the group of continuous conveyors and are relatively complicated.

The invention is therefore based on the task of improving the above-described known food-processing systems accordingly.

This task is solved by a food-processing system according to the main claim.

First of all, in accordance with the prior art, the food-processing system according to the invention comprises a cutting device ("slicer") for cutting food products into slices which then form food product portions. The food products can be, for example, pieces of meat, pieces of cheese, sticks of sausage or sticks of salami, as is also the case in the prior art. Furthermore, it should be mentioned that the food product portions formed from the cut slices each comprise one or more of the cut slices. Thus, a food product portion may be a stack of slices comprising a plurality of slices stacked on top of each other. Further, within the scope of the invention, it is possible for each of the individual food product portions to be shingles comprising a plurality of slices stacked on top of each other and laterally offset from each other. However, the invention is not limited to the portion shapes described above, but can also be realized with other portion shapes (e.g. "shaved meat", laid round, etc.).

In addition, the food-processing system according to the invention also has a conveyor system which transports the food product portions away from the cutting device along a main conveyor path. The conveyor system also fulfills several of the functions described briefly above (buffering, aligning, orienting, product formatting). In contrast to the prior art described above, however, the conveyor system fulfills these technical functions by means of a discontinuous conveyor which has at least one conveyed-products carrier ("mover") which can be moved along the main conveying path, the main conveying path being freely programmable within a conveying surface. The concept of a discontinuous conveyor used in the context of the invention distinguishes the invention, in accordance with the usual technical terminology, from continuous conveyors, such as conveyor belts, which are used in the known prior art food-processing system described at the outset. The food-processing system according to the invention thus differs from the prior art first of all by the type of conveyor (discontinuous conveyor instead of a continuous conveyor).

The discontinuous conveyor can be, for example, a planar motor drive system such as that marketed by the German company Beckhoff Automation GmbH under the product name "XPlanar". The discontinuous conveyor thus preferably has a magnetic levitation system so that the individual conveyed-products carriers float contactlessly above the conveying surface, whereby the conveying path of the individual conveyed-products carriers can be freely programmed individually for the individual conveyed-products carriers. The movement of the individual conveyed-products carriers is thus preferably not bound to a fixed conveying path. Furthermore, it should be mentioned that the discontinuous conveyor preferably comprises numerous modules, each of which is preferably rectangular and can therefore optionally be assembled to form a continuous conveying surface. This modular design of the continuous conveyor allows a great flexibility with regard to the shape of the conveying surface.

With regard to the design and mode of operation of the individual conveyed-products carriers, reference is made to the German patent application DE 10 2020 105 678.8, the contents of which are fully attributable to the present description. At this point, it is only necessary to mention that the individual conveyed-products carriers preferably have elongated parallel recesses in their loading surface, into which finger conveyors can dive in order to reach under and convey away the food product portion lying on the conveyed-products carrier, as will be described in detail. For this purpose, the conveyed-products carrier can have a plurality of pins on its upper side, which project parallel to the top and form with their free end faces the loading surface for receiving the food product portions. The pins are preferably arranged in a matrix in rows and columns, with the spaces between the rows and also the spaces between the columns forming the elongated recesses into which the finger conveyors can dive to discharge the food product portions.

In a preferred embodiment of the invention, the food-processing system additionally comprises a checking station for checking the food product portions conveyed by the conveyor system for compliance with predetermined product specifications and for detecting faulty portions that do not meet the predetermined product specifications. In addition, an ejection discharge station is preferably provided to discharge the faulty portions from the main conveying path so that the faulty portions do not reach the packaging machine and are not readily delivered to customers. For example, the checking station can weigh the food product portions and compare the weight of the food product portions to a predetermined target weight to determine the faulty portions. In addition, the checking station may also optically inspect the food product portions with a sensor (e.g., camera) to detect voids or faulty portions. The defects can be, for example, weight deviations, volume deviations, shape deviations or quality deviations, to name just a few examples.

Furthermore, the food-processing system may also include a correction zone where the faulty portions can be corrected. For example, the faulty portions are first discharged from the ejection station to the correction zone, where correction of the faulty portions can take place. If, for example, a food product portion comprises too few slices, the food product portion can be completed in the correction zone with a corresponding number of missing slices. This correction of faulty portions can optionally be done manually or automatically. After correction of a faulty portion, the corrected faulty portion can then be reintroduced into the main conveying path by the ejection station. The ejection station can be formed by the discontinuous conveyor, since the conveying path can be freely programmed within the conveying area. The discontinuous conveyor can therefore optionally transport the faulty portions along the main conveying path in the direction of the packaging machine or, in the case of a faulty portion, convey them to the correction station.

In addition, the conveyor system according to the invention can also have a discharge station for disposing of unusable product residues. For example, a cutting process usually produces initial pieces and end pieces that are not usable. These non-recyclable product pieces can then also be initially deposited on a conveyed-products carrier, which then transports the non-recyclable product pieces to the discharge station, where disposal can take place.

At the discharge station, the non-usable product pieces (e.g. initial pieces, end pieces) are then removed from the conveyed-products carrier. For example, a gripper can be provided for this purpose, which grips the initial piece or end piece on the conveyed-products carrier and then transports it away under robot guidance. Alternatively, there is the possibility of a suction device that sucks in the unusable initial piece or end piece and then transports it away. Another possibility for removing the non-usable product pieces from the conveyed-products carrier is a pusher which pushes the non-usable product pieces (e.g. initial piece, end piece) off the conveyed-products carrier. Alternatively, it is possible that the complete conveyed-products carrier is tilted by a tilting device, so that the non-usable product pieces slide down from the conveyed-products carrier. Furthermore, a blowing device can be provided, which blows the non-usable product pieces off the conveyed-products carrier. Finally, it is also possible that the non-usable product pieces are removed from the conveyed-products carrier by jerky acceleration or deceleration of the conveyed-products carrier.

It has already been mentioned above that a technical function of the conveyor system is to orient the food product portions according to a desired orientation. For this purpose, the food product portions can be rotated together with the conveyed-products carrier about an axis of rotation, which is preferably perpendicular to the conveying surface. To assist in this orientation, the conveyor system may have a camera to detect the orientation of the food product portions on the conveyed-products carriers. The individual conveyed-products carriers are then preferably rotated before the product is deposited by the cutting device in order to later achieve a desired orientation of the food product portions on the individual conveyed-products carriers on the output side. If, for example, the cutting device deposits the individual food product portions with a misorientation of 10° to the main conveying path, the individual conveyed-products carriers are preferably rotated by this angle when the food product portions are taken over by the cutting device. After a food product portion has been taken over from the cutting device, the conveyed-products carrier can then be oriented parallel to the main conveying path again, thus producing the desired orientation. This reorientation of the conveyed-products carriers and the food product portions thereon can be performed by the discontinuous conveyor, so that no additional components are required for this. For example, the conveyed-products carriers with the food product portions thereon can also be rotated by 90° or 180° in order to achieve the desired orientation of the food product portions, whereby this rotation can also take place without a camera control.

Furthermore, within the scope of the invention, there is the possibility that the discontinuous conveyor is also involved in the creation of overlapping food product portions. For this purpose, a belt conveyor is arranged above the conveying surface of the discontinuous conveyor, which is fed with food product portions by the conveyed-products carriers. Another conveyed-products carrier is then moved under the belt conveyor with a food product portion. Subsequently, the food product portions on the belt conveyor, on the one hand, and on the conveyed-products carrier below the belt conveyor, on the other hand, are moved in the initial direction, the belt conveyor then depositing its food product portion on the food product portion on the conveyed-products carrier with a predetermined overlap.

Furthermore, within the scope of the invention, it is also possible that the conveyor system comprises a transfer device for transferring slices of the food product portions between different conveyed-products carriers. For example, this transfer device may comprise a belt conveyor having on the input side a plurality of finger conveyors or knife conveyors which can enter the elongated recesses of a conveyed-products carrier in order to grip underneath and convey away the food product portions located there. This enables the completion of incomplete food product portions. If, for example, during a cutting process the number of slices cut off is not sufficient to produce a complete food product portion with the desired number of slices, the missing slices can be completed by another conveyed-products carrier.

Furthermore, it should be mentioned that the food-processing system according to the invention can have a certain number of cutting devices and a certain number of packaging machines, which do not have to be the same. For example, one cutting device can feed several packaging machines. In this case, the discontinuous conveyor makes it possible to divide up or combine the product streams accordingly.

It should further be noted that the invention does not only claim protection for the food-processing system according to the invention as described above. Rather, the invention also claims protection for an operating method for such a food-processing system. The individual process steps of the operating method according to the invention result here from the above description, so that a separate description of the individual process steps of the operating method according to the invention can be dispensed with.

BRIEF DESCRIPTION OF THE DRAWINGS

Other advantageous further embodiments of the invention are indicated in the dependent claims or are explained in more detail below together with the description of the preferred embodiments of the invention with reference to the figures.

DETAILED DESCRIPTION

Figure 1:
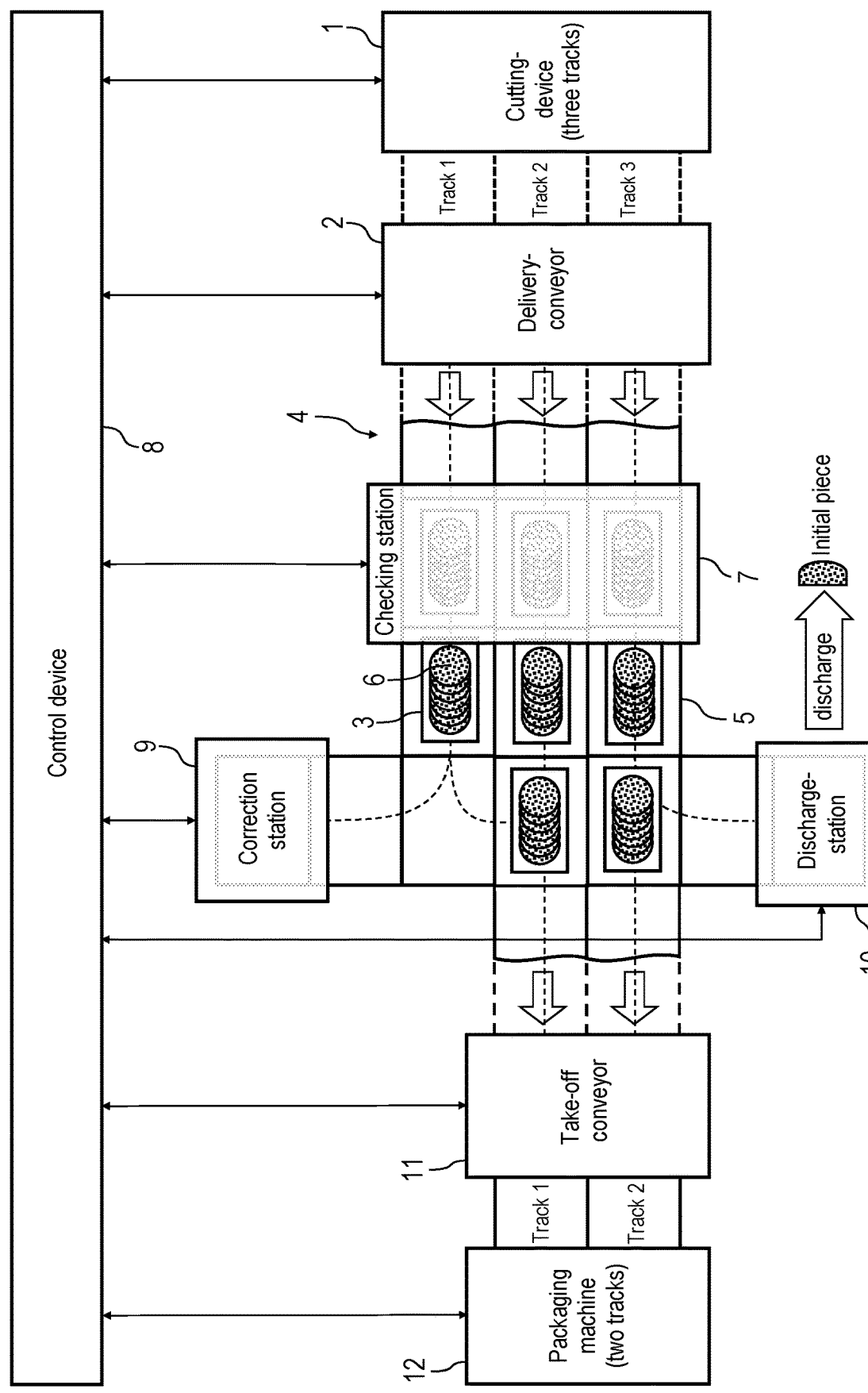
FIG. 1 shows a schematic representation of a food-processing system according to the invention.

The following describes an example of a food-processing system according to the invention as shown in FIG. 1.

The food-processing system first of all has a cutting device 1, which is also referred to as a "slicer" in accordance with the usual technical terminology, and which slices food products (e.g. pieces of cheese, pieces of meat, salami sticks, etc.). In the illustrated embodiment, the cutting device operates in three tracks, i.e., the food products are sliced in three tracks side by side.

In addition, the food-processing system has a delivery conveyor 2 that picks up the slices cut by the cutting device 1 and deposits them on conveyed-products carriers 3 ("movers") of a planar motor drive system 4. The planar motor drive system 4 is the planar motor drive system "XPlanar", which is distributed by the German company Beckhoff Automation GmbH. It should be mentioned that the conveyed-products carriers 3 can be moved freely within a horizontal conveying surface without being bound to a fixed conveying path. The conveying surface is composed of numerous rectangular modules 5, whereby this modular structure of the planar door drive system 4 allows great flexibility with regard to the shape of the conveying surface.

The delivery conveyor 2 deposits a food product portion 6 on each of the conveyed-products carriers 3, whereby the food product portions 6 in the illustrated embodiment are shingles consisting of several slices which lie staggered one above the other.

The conveying surface of the planar motor drive system 4 is spanned by a checking station 7, which contains several cameras for checking the food product portions 6 on the conveyors 3. For example, the cameras in the checking station 7 can detect the number of slices in the individual food product portions 6 and thereby detect faulty portions with an insufficient number of slices. In addition, the cameras in the checking station 7 can, for example, also detect other defects (e.g., fat eyes) in the food product portions 6.

The checking station 7 can also measure the weight of the conveyed-products carriers 3 with the food product portions 6 on them. Thus, during operation, the conveyed-products carriers 3 with the food product portions 6 thereon float above the conveying surface of the planar door drive system 4 at a certain distance, which depends on the weight of the conveyed-products carrier 3 with the food product portions 6 thereon. The width of the air gap between the conveyed-products carrier 3 and the conveying surface of the planar motor drive system 4 thus forms a measure of the weight of the food product portions 6 on the conveyed-products carrier 3. In the test station 7, therefore, the width of the air gap between the conveyed-products carrier 3 and the conveying surface of the planar motor drive system 4 can also be measured as a measure of the weight of the loaded conveyed-products carrier 3. Alternatively, it is possible that the width of the air gap between the conveyed-products carrier 3 and the conveying surface of the planar motor drive system 4 is kept constant by adjusting the power of the planar motor drive system 4 accordingly, with the power of the planar motor drive system 4 then forming a measure of the weight of the loaded conveyed-products carrier.

Alternatively, however, it is also possible for the weight of the conveyed-products carriers 3 to be measured in a separate weighing station located between the conveyor system and the slicer.

The checking station 7 thus determines the weight of the food product portions 6 on the conveyors 3 and also inspects the food product portions 6 optically with the cameras. The checking station 7 then sends a corresponding signal to a higher-level control device 8, which also controls the cutting device 1 and the delivery conveyor 2. If the checking station 7 determines that the food product portion 6 is an incorrect portion, the control device 8 controls the planar motor drive system 4 so that the conveyed-products carrier 3 with the food product portion 6 is discharged to a correction station 9. At the correction station 9, the faulty portion can then be corrected by, for example, adding a missing slice, to give just one example. Subsequently, the planar motor drive system 4 can feed the corrected miss portion back into the main conveying path.

If, on the other hand, the inspection in the checking station 7 shows that there is a non-usable initial piece or end piece on one of the conveyed-products carriers 3, the associated conveyed-products carrier 3 is transported by the planar motor drive system 4 to a discharge station 10, where the non-usable initial pieces or end pieces are then removed from the conveyed-products carrier 3 and disposed of.

The conveyed-products carriers 3 with the food product portions 6 thereon are then transported by the planar motor drive system 4 to a take-off conveyor 11, which removes the food product portions 6 from the respective conveyed-products carrier 3 and transports them in two parallel tracks to a packaging machine 12.

The packaging machine 1 operates here at two tracks, while the cutting device 1 operates at three tracks. The planar motor drive system 4 thus also enables track conversion from three input tracks to two output tracks.

Furthermore, it should be mentioned that the control device 8 not only controls the cutting device 1, the planar motor drive system 4 and the delivery conveyor 2. Rather, the control device 8 is also connected to the checking station 7, the correction station 9, the discharge station 10, the take-off conveyor 11 and the packaging machine 12. It should be mentioned here that the control device 8 is shown as a single component for simplicity. In fact, however, the control device 8 can also be realized as a distributed system with several controllers, whereby the controller can also be realized partly in hardware and partly in software.

Finally, it should be mentioned that the planar motor drive system 4 may also have a return track to transport empty conveyed-products carriers 3 back to the delivery conveyor 2. However, the return track is not shown in the drawing for simplicity.

Figure 2:
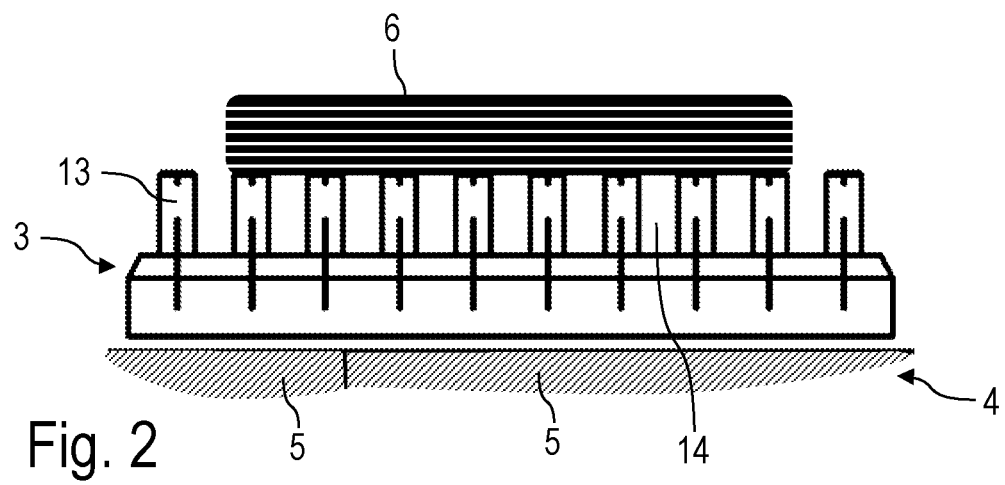
FIG. 2 shows a side view of a conveyed-products carrier of the food-processing system of FIG. 1.
Figure 3:
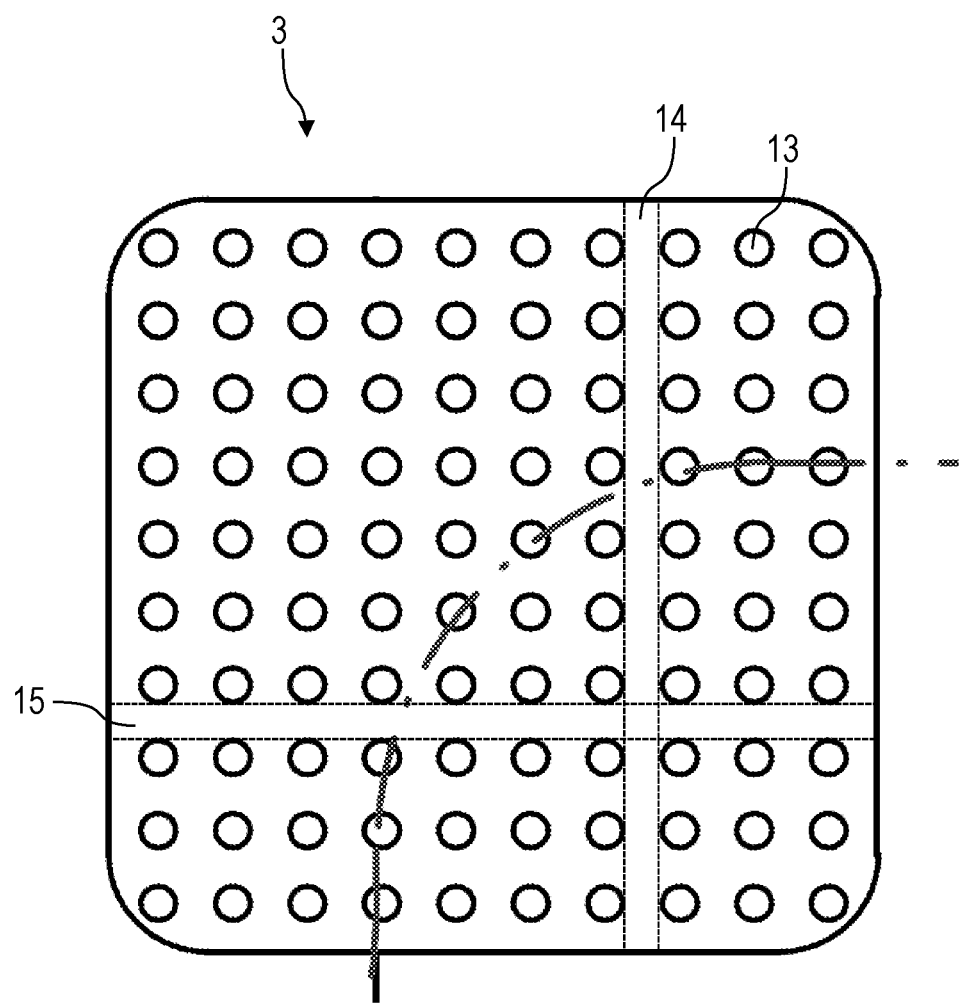
FIG. 3 shows a top view of the conveyed-products carrier according to FIG. 2.
Figure 4:
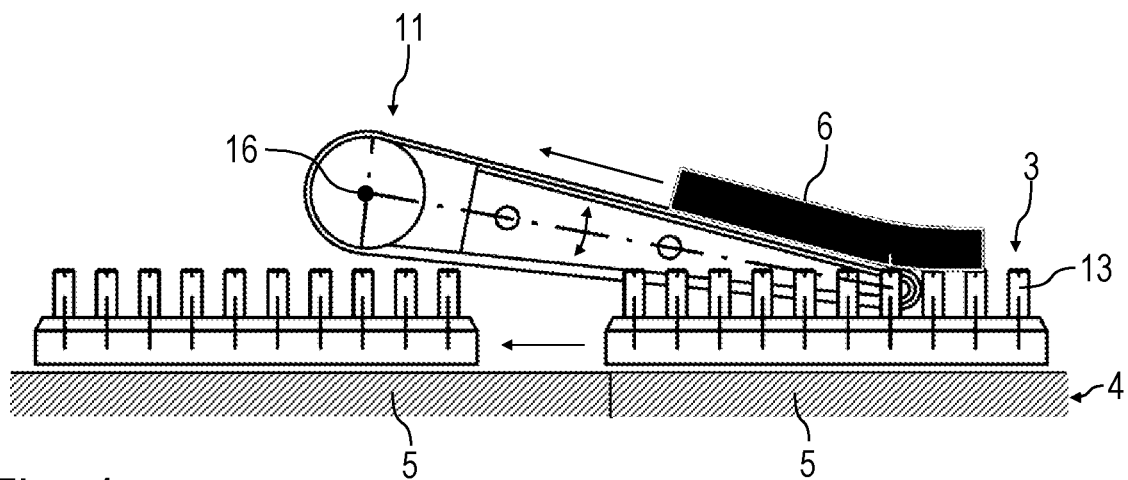
FIG. 4 shows a side view of a take-off conveyor for taking off the food product portions from the individual carriers.

FIGS. 2 and 3 show different views of one of the conveyed-products carriers 3 on the planar motor drive system 4. The design and operation of the conveyed-products carrier 3 is also described in the German patent application DE 10 2020 105 678.8, the contents of which are fully attributable to the present description. At this point, it is only necessary to mention that the conveyed-products carrier 3 has numerous pins 13 on its upper side, which protrude parallel to the top and are arranged in matrix form in rows and columns. The adjacent rows and also the adjacent columns include here at respective elongated recesses 14, 15 which facilitate the conveying away of the food product portions 6 from the conveyed-products carrier 3, as will be described in detail. Thus, FIG. 4 shows a side view of one of the take-off conveyors 11, which are pivotable about a pivot axis 16. In this case, the individual take-off conveyors 11 consist of a number of adjacent and relatively narrow finger conveyors which can dive into the elongated recesses 14 or 15 on the upper side of the conveyed-product carrier 3 in order to grip underneath and convey away the food product portions 6 on the conveyed-product carrier 3.

Figure 5:
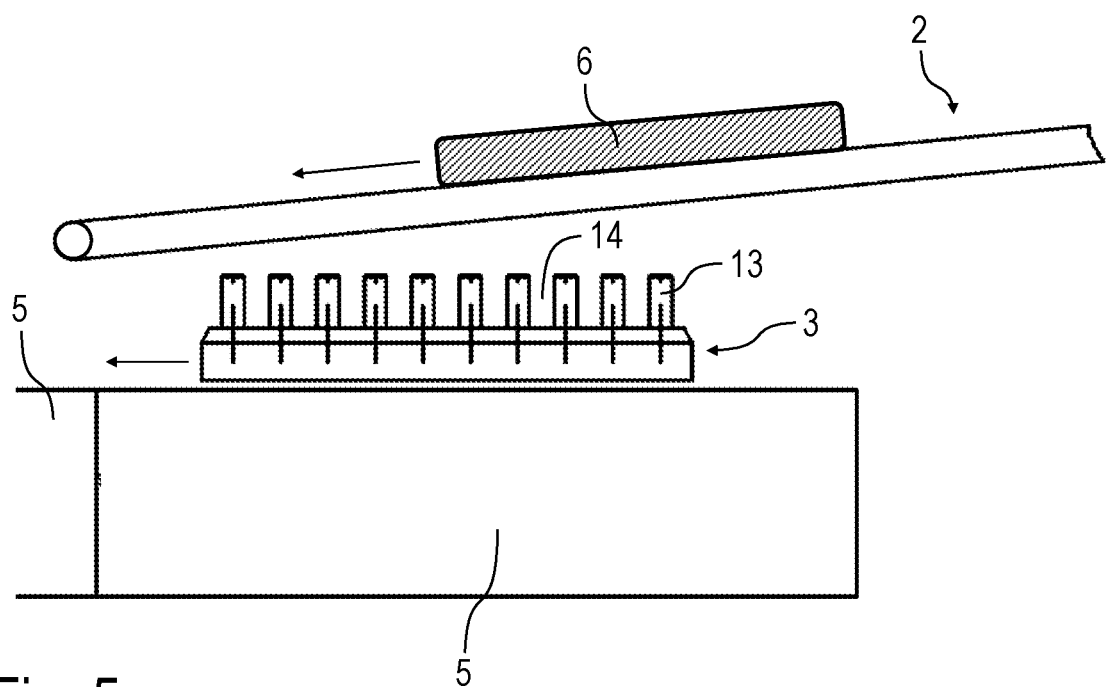
FIG. 5 shows a side view of a discharge conveyor for discharging the food product portions onto the individual conveyed-products carriers.

FIG. 5, on the other hand, shows a schematic representation of the delivery conveyor 2, which deposits the food product portions 6 on the individual conveyed-products carriers 3.

Figure 6:
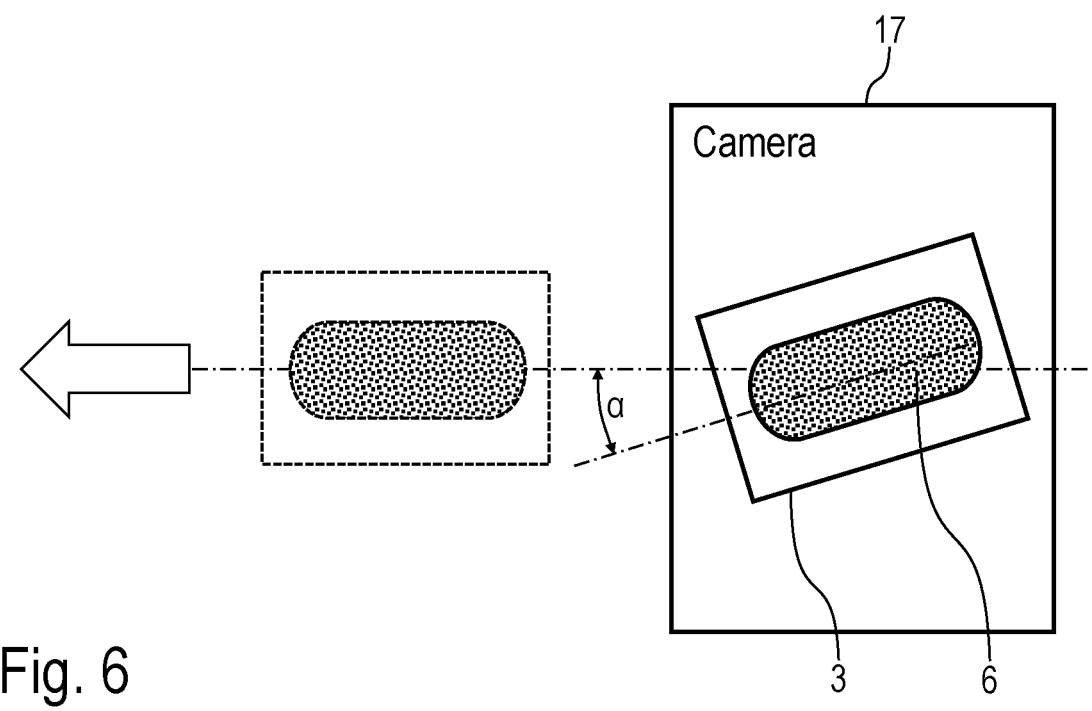
FIG. 6 shows a schematic view of the reorientation of the food product portions on the conveyed-products carriers.

FIG. 6 shows a schematic illustration of the orientation function of the planar motor drive system 4. Thus, the planar motor drive system 4 can rotate the conveyed-products carriers 3 about their vertical axis so that the food product portions 6 on the conveyed-products carrier 3 have a predetermined orientation. FIG. 6 shows the conveyed-products carrier 3 during the product deposition of the food product portions 6 from the cutting device 1. Thus, the food product portions 6 are initially deposited on the conveyed-products carrier 3 with a misalignment angle α relative to the main conveyor device, which is detected by a camera 17. The conveyed-products carrier 3 is therefore rotated accordingly before the food product portion 6 is deposited on the conveyed-products carrier 3. After the product deposition of the food product portion 6 on the conveyed-products carrier 3, the conveyed-products carrier 3 is then rotated again accordingly, as shown in dashed lines in the drawing, whereby the food product portion 6 is then correctly aligned again despite the initial misalignment during the product deposition.

Figure 7A:
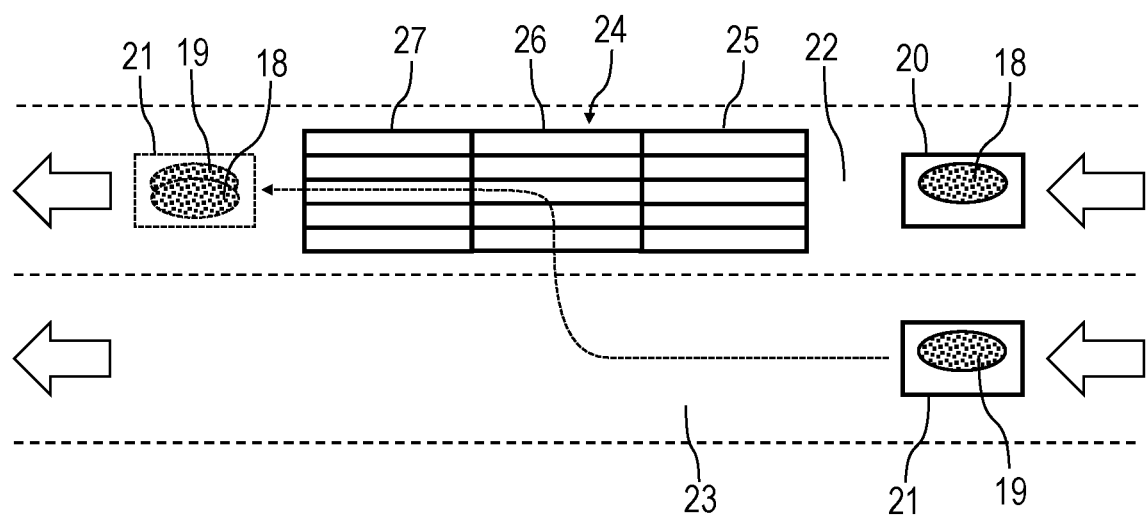
FIG. 7A shows a schematic top view of a food-processing system according to the invention which also allows overlapping of food product portions.
Figure 7B:
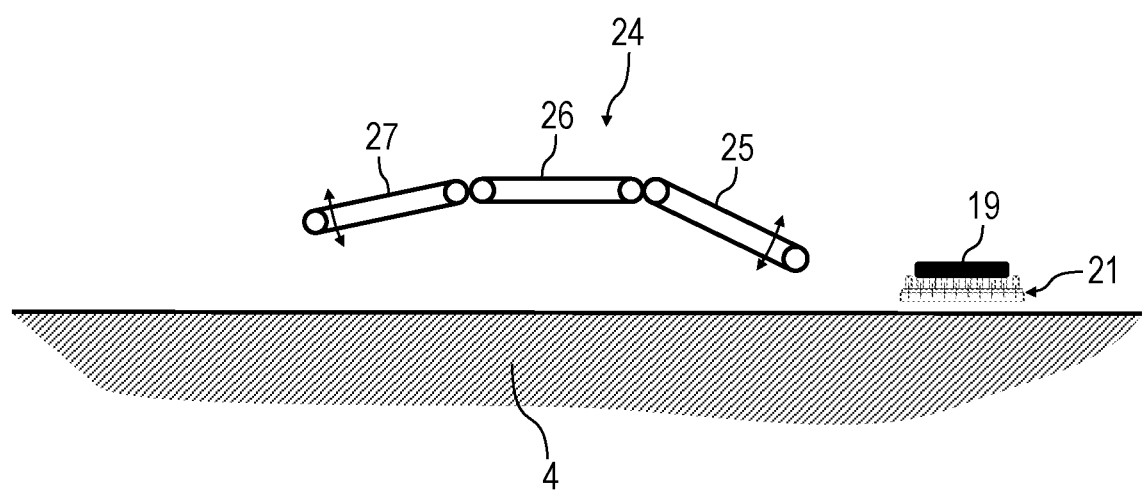
FIG. 7B shows a side view of the food-processing system according to FIG. 7A.

FIGS. 7A and 7B show different views of an alternative embodiment of a food-processing system according to the invention, which also allows overlapping of food product portions 18, 19. Here, the food product portions 18, 19 are conveyed on conveyed-products carriers 20, 21 in two parallel conveyor tracks 22, 23.

A belt conveyor 24 is arranged in the right-hand conveyor track 22, which consists of a take-off conveyor 25, an intermediate conveyor 26 and a discharge conveyor 27. The take-off conveyor 25 takes over the food product portions 18 from the conveyed-products carrier 20 and then passes the taken-over food product portion 18 on to the intermediate conveyor 26 and to the delivery conveyor 27. The delivery conveyor 27 then deposits the food product portions 18 on top of the food product portion 19 on the other conveyed-products carrier 21.

FIGS. 8A-8F now show the overlapping process in several successive stages.

Figure 8A:
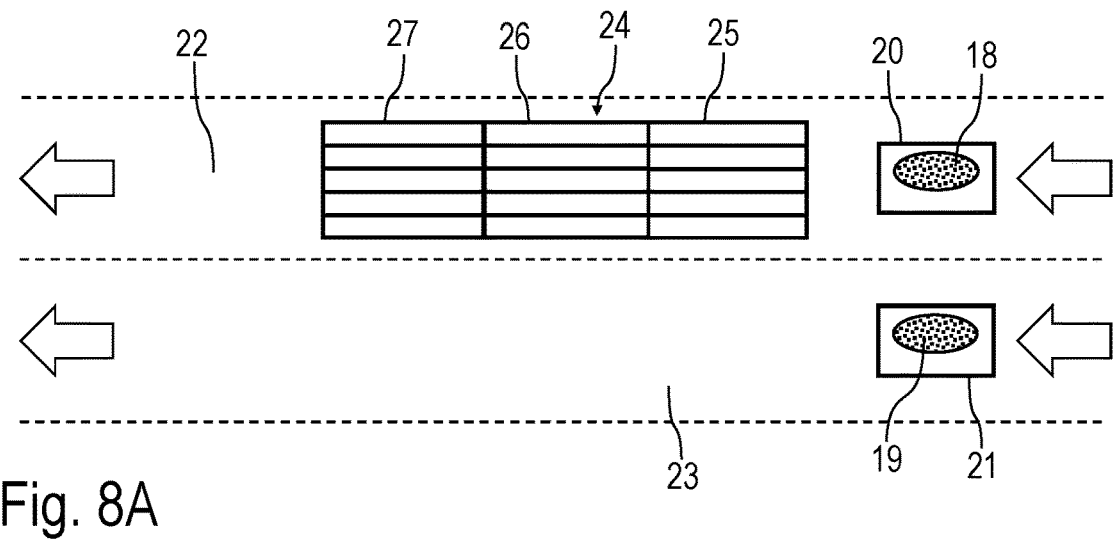
FIGS. 8A-8F show various steps of the operating method for overlapping food product portions according to the invention.

In the stage according to FIG. 8A, the two conveyed-products carriers 20, 21 with the two food product portions 18, 19 are conveyed in the two conveyor tracks 22, 23.

Figure 8B:
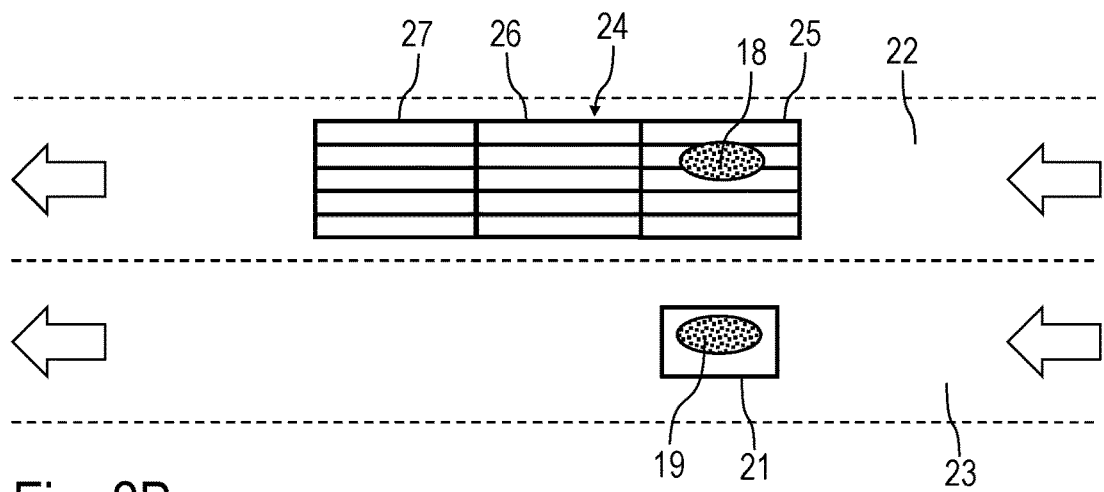

At the stage shown in FIG. 8B, the food product portion 18 is removed from the conveyed-products carrier 22 and taken over by the take-off conveyor 25. At this stage, the conveyed-products carrier 21 with the food product portion 19 continues to move alongside the belt conveyor 24.

Figure 8C:
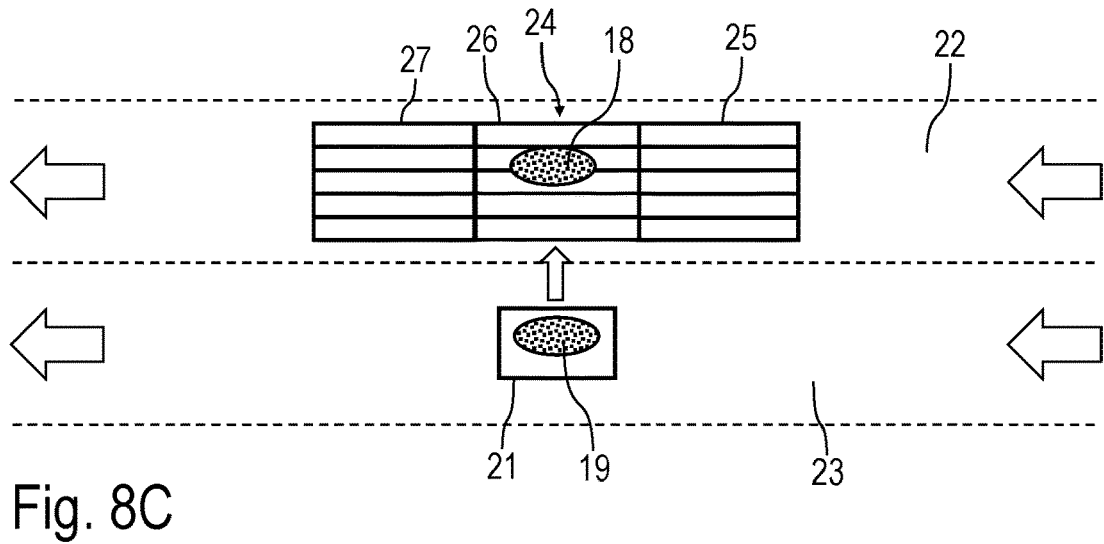

At the stage shown in FIG. 8C, the food product portion 18 has then reached the intermediate conveyor 26 and the other conveyed-products carrier 21 is located laterally next to it.

Figure 8D:
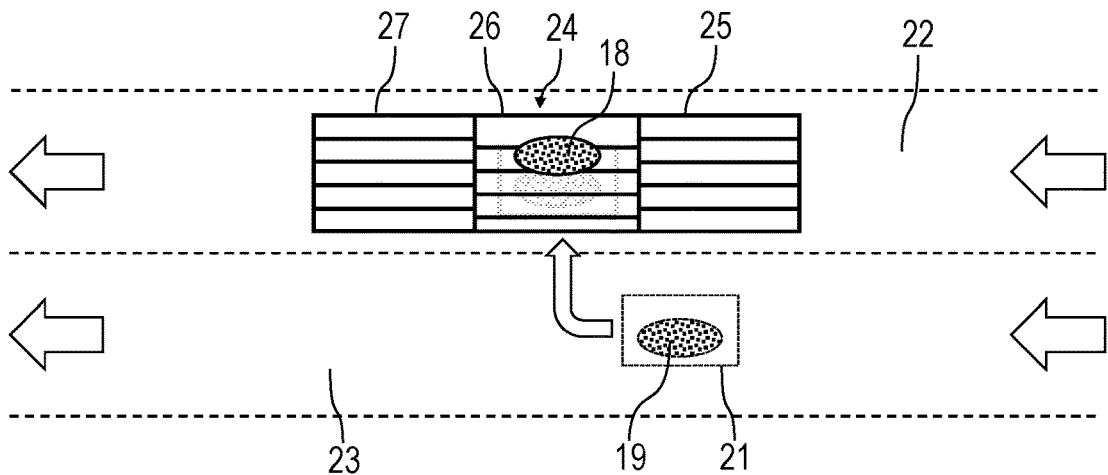

At the stage shown in FIG. 8D, the conveyed-products carrier 21 with the food product portion 19 is then below the intermediate conveyor 26.

Figure 8E:
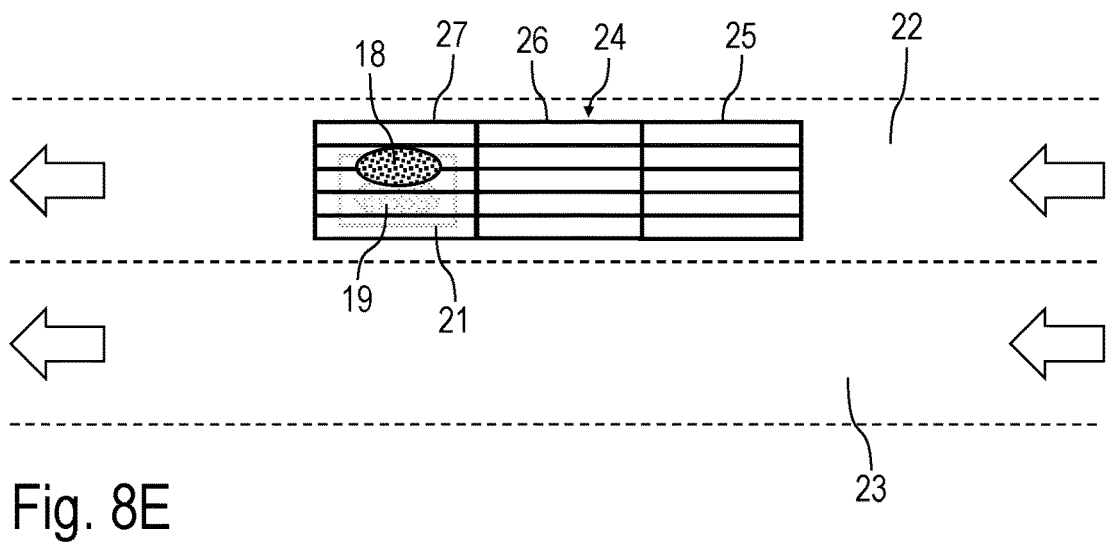

At the stage shown in FIG. 8E, the two food product portions 18, 19 are then located one above the other on the delivery conveyor 27, on the one hand, and below it on the conveyed-products carrier 21, on the other hand.

Figure 8F:
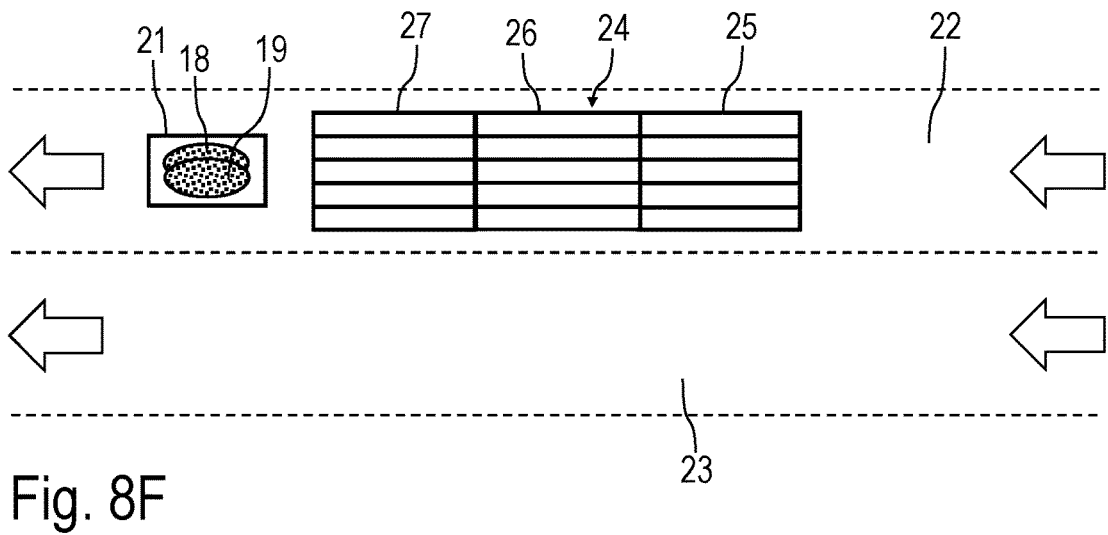

In FIG. 8F, it is then shown that the delivery conveyor 27 has deposited the food product portion 18 on top of the food product portion 19 on the conveyed-products carriers 21, with the two food product portions 18, 19 overlapping.

Thus, the arrangement shown allows the food product portions 18, 19 to be arranged in an overlapping manner.

Figure 9:
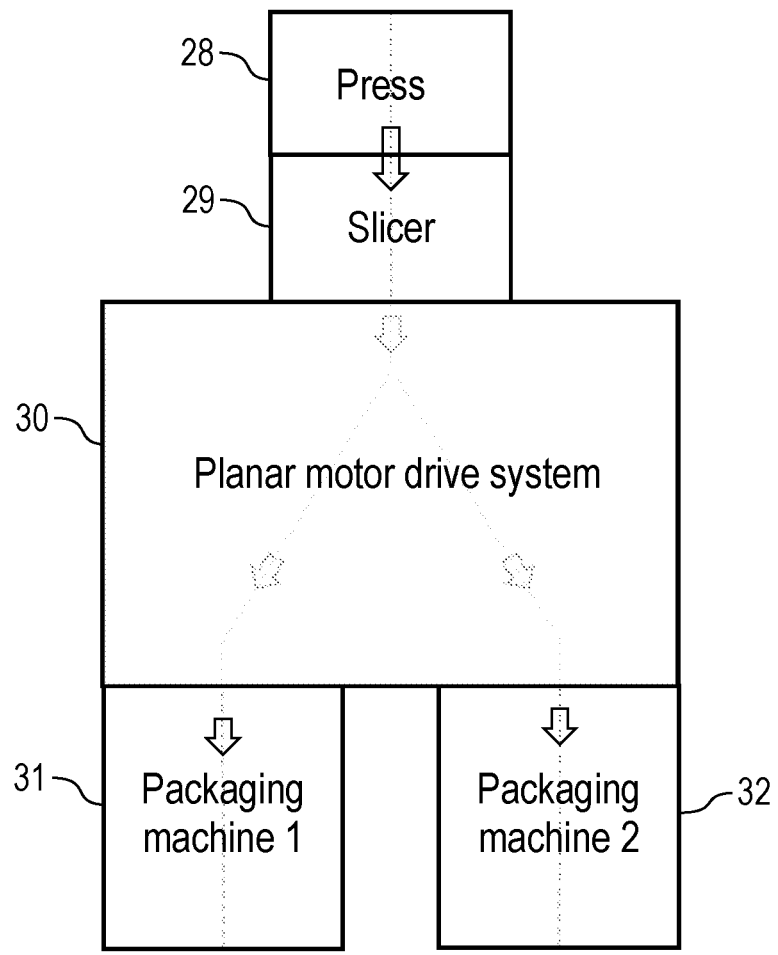
FIG. 9 shows a schematic representation of a food-processing system according to the invention, in which a cutting device feeds two packaging machines.

FIG. 9 shows a schematic representation of a food-processing system according to the invention with a press 28 which first presses the food products, which can be useful, for example, with frozen products and is known from the state of the art.

The press 28 then delivers the pressed food products to a cutting device 29 ("slicer"), which here operates in a single track.

The slicer 29 then transfers the food product portions from several slices to a planar motor drive system 30, as already described above, whereby the planar motor drive system 30 in each case moves conveyed-products carriers with the individual food product portions.

On the output side, the planar motor drive system 30 then feeds two packaging machines 31, 32. The planar motor drive system 30 thus enables two packaging machines 31, 32 to be fed by only a single cutting device 29.

Figure 10:
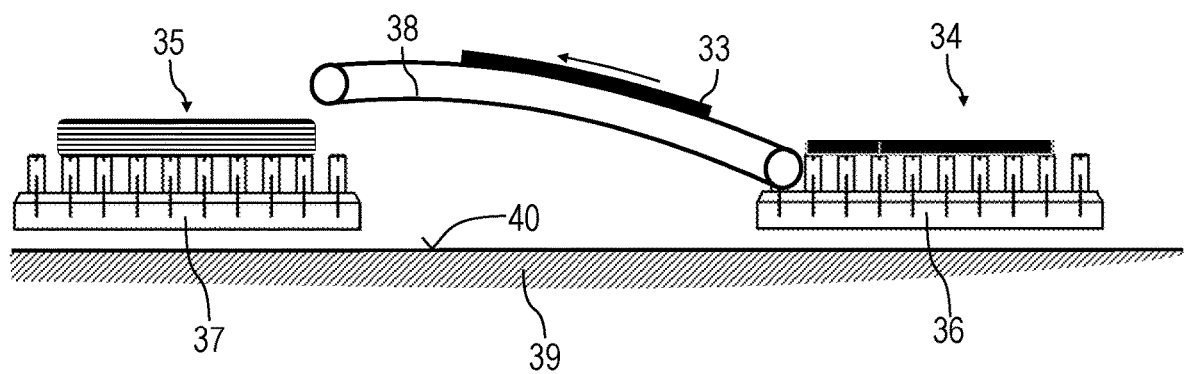
FIG. 10 shows a schematic diagram for the transfer of slices between different conveyors.

Finally, FIG. 10 shows a schematic diagram for transferring individual slices 33 between two food product portions 34, 35 lying on two conveyors 36, 37. In the embodiment shown, the food product portion 35 on the conveyed-products carrier 37 is not complete, so the disc 33 is removed from the food product portion 34 and placed on the food product portion 35 for completion. For the transfer of the disk 33 between the two conveyed-products carriers 36, 37, a conveyor 38 is provided here, which has several narrow finger conveyors on the input side, which can dive into the elongated recesses between the adjacent pins in order to grip under the food product portion 34, as has already been described above. The drawing here is only schematic in order to illustrate the principle of transfer of the discs 33 between the conveyed-products carriers 36, 37. Furthermore, it should be mentioned that the conveyed-products carriers 35, 36 can be freely moved here on a planar motor drive system 39 within a horizontal conveying surface 40.

The invention is not limited to the preferred embodiments described above. Rather, the invention encompasses a multitude of variants and variations which also make use of the inventive concept and therefore fall within the scope of protection. In particular, the invention also claims protection for the subject matter and the features of the dependent claims independently of the claims referenced in each case and in particular also without the features of the main claim. The invention thus comprises various aspects of the invention which enjoy protection independently of each other.

LIST OF REFERENCE SIGNS

1 Cutting device ("slicer")
2 Delivery conveyor
3 Conveyed-products carriers
4 Planar motor drive system for driving the conveyed-products carriers
5 Modules of the planar motor drive system
6 Food product portion on the conveyed-products carrier
7 Checking station with cameras for checking the food product portions
8 Control device
9 Correction station
10 Discharge station
11 Take-off conveyor
12 Packaging machine
13 Pins on the upper side of the conveyed-products carrier
14, 15 Elongated recesses between the pins
16 Swivel axis of the take-off conveyor
17 Camera
18, 19 Food product portions
20, 21 Conveyed-products carriers
22, 23 Conveyor tracks
24 Belt conveyor
25 Take-off conveyor
26 Intermediate conveyor
27 Discharge conveyor
28 Press
29 Cutting device ("slicer")
30 Planar motor drive system for driving the conveyors
31, 32 Packaging machines
33 Slice
34, 35 Food product portions
36, 37 Conveyed-products carriers
38 Transfer conveyor
39 Planar motor drive system
40 Conveying surface of the planar motor drive system

The invention claimed is:

1. A food-processing system for processing food products comprising:
a cutting device configured to cut the food products into one or more slices to form food product portions, and
a discontinuous conveyor configured to convey the food product portions away from the cutting device, the discontinuous conveyor defining a conveying surface and having at least one conveyed-products carrier movable along a main conveying path which is freely programmable within the conveying surface; and
a belt conveyor defining a conveying direction arranged above the conveying surface, and
wherein the discontinuous conveyor performs the following functions in the food-processing system:
buffering the food product portions delivered from the cutting device in a buffer zone on the discontinuous conveyor prior to further transport of the food product portions along the main conveyor path,
aligning of the food product portions in a lateral direction transversely to the main conveying path by a displacement of the food product portions in the lateral direction transversely to the main conveying path,
orientation of the food product portions relative to the main conveying path by rotating the food product portions relative to the main conveying path, and
product formatting from an incoming product format with a predetermined number of parallel conveyor tracks into an outgoing product format with a predetermined number of parallel conveyor tracks, wherein the number of incoming conveyor tracks is different from the number of outgoing conveyor tracks, and
wherein:
the discontinuous conveyor delivers a first one of the conveyed-products carriers with a first one of the food product portions which is taken over by the belt conveyor,
the discontinuous conveyor delivers a second one of the conveyed-products carriers with a second one of the food product portions and positions the second conveyed-products carrier on the conveying surface under the belt conveyor, and
the discontinuous conveyor moves the second conveyed-products carrier out from under the belt conveyor in the conveying direction of the belt conveyor, whereby the belt conveyor deposits the first food product with at least partial overlap on the second food product lying on the second conveyed-products carrier.

2. The food-processing system according to claim 1, further comprising
a checking station configured to check the food product portions conveyed by the discontinuous conveyor for compliance with predetermined product specifications and for detecting faulty portions among the food product portions that do not meet the predetermined product specifications, and
an ejection station configured to eject the faulty portions from the main conveying path.

3. The food-processing system according to claim 2, wherein:
wherein the checking station weighs the food product portions and compares the weight of the food product portions with a predetermined target weight to determine the faulty portions, and/or
the checking station optically checks the food product portions in order to detect defects, and classifies the checked food product portions as faulty portions as a function of the defects determined.

4. The food-processing system according to claim 2, wherein
the ejection station discharges the faulty portions into a correction zone in which the faulty portions can be corrected manually or automatically, and
the ejection station reintroduces the corrected faulty portions from the correction zone into the main conveying path.

5. The food-processing system according to claim 1, wherein:
an initial piece and an end piece is produced during a cutting operation of one of the food products, and the conveying system takes over the initial piece and/or the end piece on one of the conveyed-products carriers from the cutting device, and the discontinuous conveyor further comprises a discharge station for removing a non-usable initial piece and/or a non-usable end piece from the conveyed-products carrier.

6. The food-processing system according to claim 5, wherein the discharge station comprises:
- a gripper configured to grip the initial piece and/or the end piece on the conveyed-products carrier, or
- a suction device configured to suck the initial piece and/or the end piece onto the conveyor support, or
- a movably guided pusher configured to push the initial piece and/or the end piece down from the conveyed-products carrier, or
- a tilting device configured to tilt the conveyed-products carrier with the initial piece and/or end piece located thereon and configured to tilt the initial piece and/or end piece down from the conveyed-products carrier, or
- a blowing device configured to blow down the initial piece and/or the end piece from the conveyed-products carrier, or
- a device configured to jerkily accelerate and/or brake the conveyed-products carrier so that the non-usable end pieces slide off the conveyed-products carrier, or
- a finger conveyor belt.

7. The food-processing system according to claim 1, wherein the discontinuous conveyor further comprises a rotating device configured to rotate the at least one conveyed-products carrier about an axis of rotation at right angles to the conveying surface in order to set a predetermined orientation of the food product portion on the conveyed-products carrier.

8. The food-processing system according to claim 1, further comprising
a control device configured to control the discontinuous conveyor and the belt conveyor.

9. The food-processing system according to claim 1, wherein the discontinuous conveyor further comprises a transfer device configured to transfer slices of the food product portions between different conveyed-products carriers configured to assemble complete food product portions from several incomplete food product portions.

10. The food-processing system according to claim 1, further comprising
at least one cutting device which supplies at least one conveying stream of the food product portions; and
at least one packaging machine which receives a delivery stream of the food product portions and packaging the food product portions delivered in the delivery stream into packages.

11. The food-processing system according to claim 10, wherein the number of the cutting devices is different from the number of the packaging machines, and
wherein the discontinuous conveyor
divides the conveying streams arriving on an input side from the at least one cutting device into a plurality of conveying streams on an output side configured to feed individual ones of the packaging machines, or
combines the multiple conveying streams incoming on the input side from multiple ones of the cutting devices into at least one conveying stream configured to feed the at least one packaging machine.

12. The food-processing system according to claim 9, wherein the discontinuous conveyor transfers loaded conveyed-products carriers between the different conveyor streams.

13. The food-processing system according to claim 8, wherein the control device includes a control computer and a program memory in which a control program is stored, the control program, when executed, causing the control computer to control the food-processing system.

14. The food-processing system according to claim 2, wherein the checking station is arranged between the cutting device and the discontinuous conveyor.

15. The food-processing system according to claim 3, wherein the sensor is a camera.

16. The food-processing system according to claim 7, wherein the rotating device is provided by the discontinuous conveyor.

17. The food-processing system according to claim 16, wherein the discontinuous conveyor comprises a camera configured to detect the orientation of the food product portions on the conveyed-products carriers.

18. The food-processing system according to claim 17, further comprising a control device connected on an input side to the camera and on an output side to the rotating device and which controls the rotating device as a function of the determined orientation of the food product portion.

19. The food-processing system according to claim 7, wherein the rotating device is arranged directly on the cutting device so that the slices off by the cutting device are deposited on the conveyed food product portion carrier which is rotated by the rotating device into a desired orientation.

20. The food-processing system according to claim 9, wherein the transfer device is a belt conveyor.

* * * * *